(12) United States Patent
Kemper

(10) Patent No.: US 9,944,138 B2
(45) Date of Patent: Apr. 17, 2018

(54) AUTOMATICALLY ADJUSTING BALL-MOUNT HITCH APPARATUS

(71) Applicant: Michael D. Kemper, Granada Hills, CA (US)

(72) Inventor: Michael D. Kemper, Granada Hills, CA (US)

( * ) Notice: Subject to any disclaimer, the term of this patent is extended or adjusted under 35 U.S.C. 154(b) by 0 days.

(21) Appl. No.: 14/592,763

(22) Filed: Jan. 8, 2015

(65) Prior Publication Data

US 2015/0197125 A1    Jul. 16, 2015

Related U.S. Application Data

(60) Provisional application No. 61/926,048, filed on Jan. 10, 2014.

(51) Int. Cl.
*B60D 1/46* (2006.01)
*B60D 1/06* (2006.01)
*B60D 1/66* (2006.01)

(52) U.S. Cl.
CPC ............ *B60D 1/46* (2013.01); *B60D 1/06* (2013.01); *B60D 1/665* (2013.01)

(58) Field of Classification Search
CPC ... B60D 1/06; B60D 1/44; B60D 1/46; B60D 1/065; B60D 1/173
USPC .................... 280/446.1, 504, 507
See application file for complete search history.

(56) References Cited

U.S. PATENT DOCUMENTS

| | | | | |
|---|---|---|---|---|
| 3,750,254 A | * | 8/1973 | Krajcik ............... | B66F 3/24 254/134 |
| 4,238,113 A | * | 12/1980 | Adams ............... | B66F 3/16 254/134 |
| 4,648,617 A | * | 3/1987 | Hannappel ........ | B62D 63/065 280/304.3 |
| 6,612,615 B1 | * | 9/2003 | Dimand ............. | B60R 9/06 224/531 |
| 2005/0206127 A1 | * | 9/2005 | Christensen ...... | B60D 1/46 280/511 |
| 2006/0186639 A1 | * | 8/2006 | Rosario ............. | B60D 1/065 280/507 |
| 2008/0164678 A1 | * | 7/2008 | White ................ | B60D 1/143 280/504 |
| 2009/0057633 A1 | * | 3/2009 | Beck .................. | B60D 1/66 254/420 |

* cited by examiner

*Primary Examiner* — Joseph M Rocca
*Assistant Examiner* — Felicia L. Brittman
(74) *Attorney, Agent, or Firm* — Kelly & Kelley, LLP

(57) ABSTRACT

An automatically adjusting ball-mount hitch apparatus is disclosed having a hitch ball extending from a platform. A shaft extends from the platform and is slidably disposed within a sleeve. A hitch bar has a first generally horizontal arm adapted to be removably attached to a receiver hitch of a towing vehicle. A generally vertical arm of the hitch bar is attached to a coupling that is connected to or formed integrally with the sleeve. The shaft is capable of vertical movement within the sleeve in response to vertical forces applied to the platform, permitting the platform and the hitch ball to move vertically, independent of the hitch bar and the towing vehicle receiver, in an automatic fashion during use of the apparatus.

26 Claims, 4 Drawing Sheets

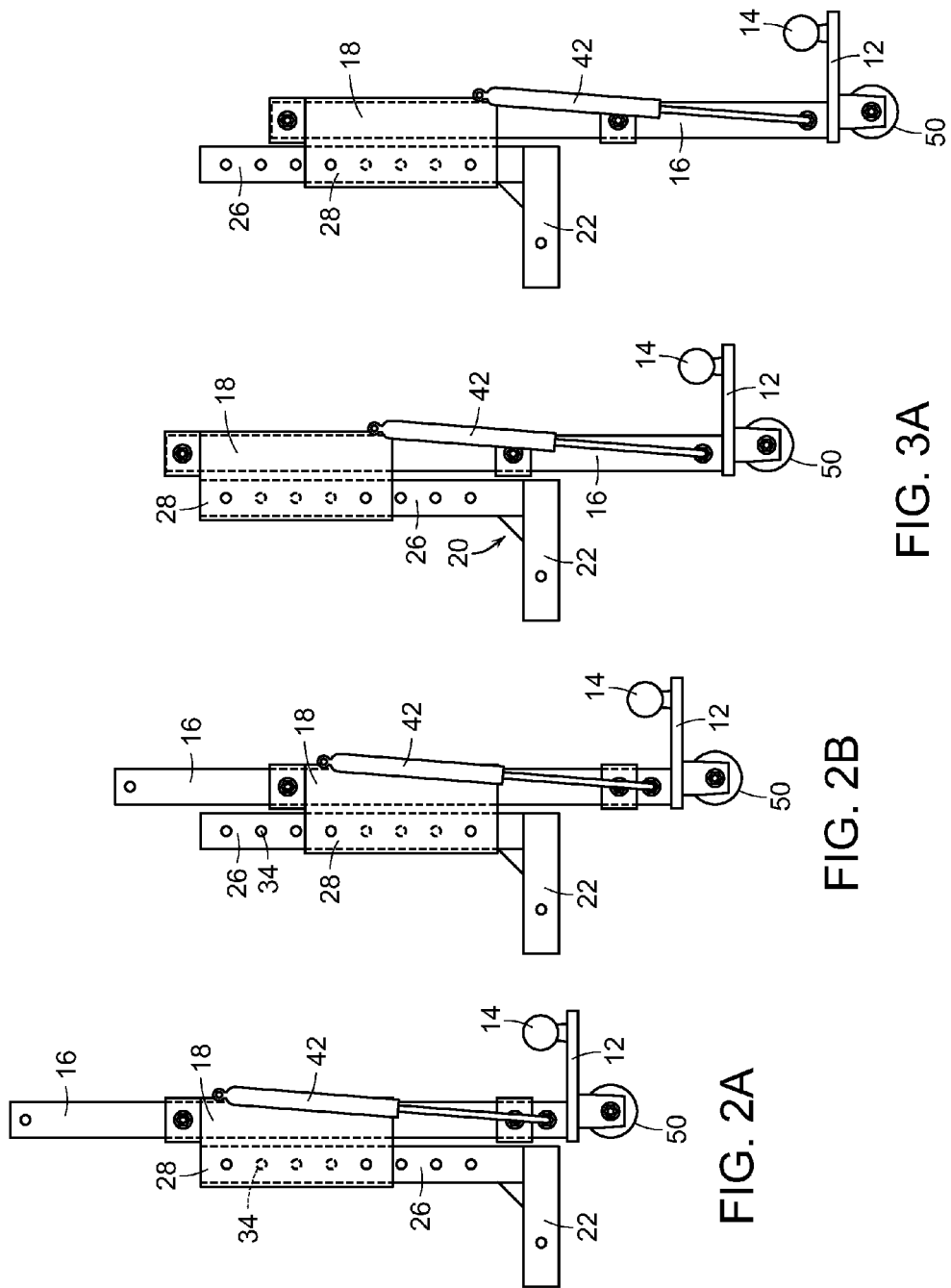

AUTOMATICALLY ADJUSTING BALL-MOUNT HITCH APPARATUS

RELATED APPLICATION

This application claims priority to U.S. Provisional Application Ser. No. 61/926,048, filed on Jan. 10, 2014.

BACKGROUND OF THE INVENTION

The present invention generally relates to trailer hitches for connecting a trailing vehicle to a towing car, truck or other vehicle. More particularly, the present invention relates to an automatically adjusting ball-mount hitch apparatus, wherein a portion of the apparatus connected to the trailing vehicle is capable of vertical movement when the apparatus is in use.

Many people have a need to haul something behind their car or truck. Typically, a trailer or trailing vehicle is coupled to the towing vehicle with a hitch assembly. Traditional towing techniques typically include a vehicle and an apparatus being towed, such as a trailer, which are joined together by a coupling. The coupling is accomplished using a ball-mount having a ball at one end. The ball-mount is inserted into a receiver at the rear of the vehicle with the ball mount extending distally from the vehicle. The trailer is then joined to the ball using a coupler located at the front of the trailer. In instances where the towing vehicle has a receiver height that is greater than the coupler height of the trailer, a "drop-hitch" or ball-mount that extends downward is utilized.

The traditional towing technique allows the vehicle and trailer to have some independent pitch, roll and yaw movement. However, the disadvantage of this technique is that the link between the vehicle and trailer is stationary and has a fixed height. When the vehicle passes through an incline or decline, the height of the ball-mount from the ground decreases. If the change of height is large enough, the vehicle's ball-mount and trailer coupling will make impact with the ground, exerting massive amounts of pressure onto the ball-mount and associated equipment. This impact often causes damage to the vehicle, towing equipment, and ground, roadway, or driveway. To correct this problem it would be desirable to have a towing system that allows vertical movement of the link between the vehicle and trailer in response to varying road angles.

Accordingly, there is a continuing need for a ball-mount hitch apparatus which automatically adjusts the ball-mount height when in use. Such an apparatus should allow vertical movement of the ball-mount in relation to the vehicle's receiver height, such that the angle between the towing vehicle and the trailer changes, the ball-mount height can raise or lower, preventing impact with the ground. The present invention fulfills these needs and provides other related advantages.

SUMMARY OF THE INVENTION

The present invention resides in an automatically adjusting ball-mount hitch apparatus which allows the hitch ball to move vertically independent of the connection to the towing vehicle.

The ball-mount hitch apparatus of the present invention generally comprises a platform having a hitch ball extending therefrom. A shaft extends vertically from the platform and is slidably disposed within a sleeve. A generally L-shaped hitch bar has a first generally horizontal arm adapted to be removably attached to a receiver hitch of a towing vehicle. A generally vertical arm of the hitch bar is attached to a coupling that is connected to or formed integrally with the sleeve. The shaft is capable of vertical movement within the sleeve in response to vertical forces applied to the platform, permitting the platform and the hitch ball to move vertically, independent of the hitch bar.

The coupling and the sleeve may be defined by a slide cage. The coupling and sleeve may comprise adjacent tubes of the slide cage, the coupling tube receiving the vertical arm of the hitch bar therein. Alternatively, at least one extension extends between and is connected to the coupling and the sleeve. Typically, the extension is pivotally connected to at least one of the coupling and the sleeve.

The vertical arm of the hitch bar is adjustably connected to the coupling along a length thereof. For example, the vertical arm of the hitch bar may include a series of spaced-apart apertures alignable with an aperture of the coupling for insertion of a pin therethrough to lock the vertical arm of the hitch bar to the coupling.

Preferably, the apparatus includes a dampener for controlling the vertical movement of the shaft. The dampener may comprise a shock absorber operably connected to or associated with the shaft at one end thereof into the sleeve at a generally opposite end thereof. Alternatively, the dampener may be associated with the extension for dampening the movement of the shaft within the sleeve.

A roller may extend downwardly from the platform. The roller may be connected with the platform so as to swivel with respect to the platform.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIGS. 2A and 2B are diagrammatic side elevational views illustrating the movement of the hitch ball, in accordance with the present invention;

FIGS. 3A and 3B are views similar to views 2A and 2B, but illustrating a sleeve of the apparatus moved into reverse orientation to provide a greater length of travel of the hitch ball, in accordance with the present invention;

DETAILED DESCRIPTION OF THE PREFERRED EMBODIMENTS

As shown in the accompanying drawings, which are provided for exemplary purposes, the present invention relates to a ball-mount hitch apparatus which permits the hitch ball height to automatically raise or lower as the angle between the towing vehicle and the trailer changes, preventing impact with the ground, as the ball-mount hitch apparatus is in use.

Figure 1:
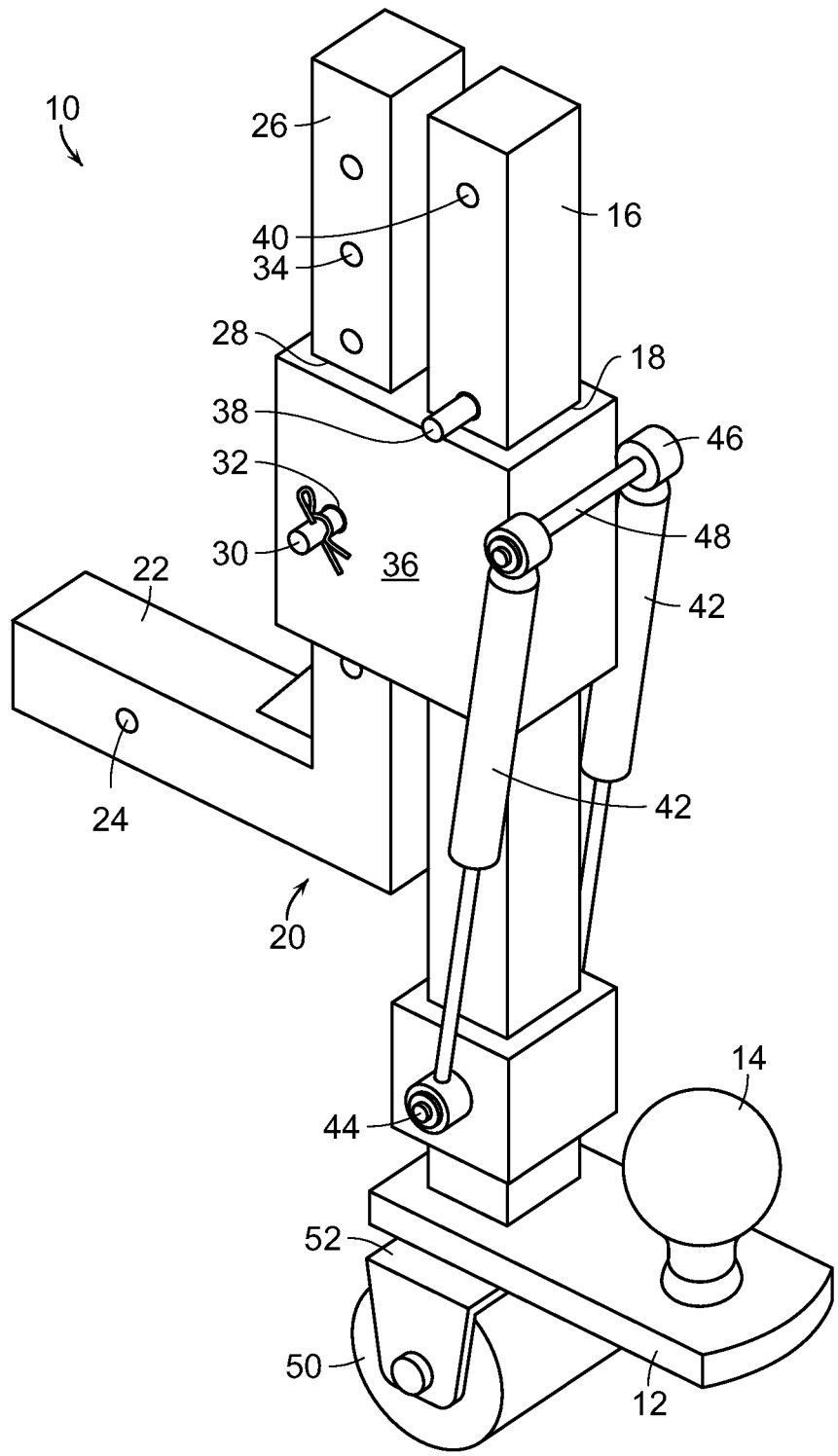
FIG. 1 is a side perspective view of a ball-mount hitch apparatus embodying the present invention.

With reference to FIG. 1, the ball-mount hitch apparatus, generally referred to by the reference number 10, includes a platform 12 supporting a hitch ball 14. Such hitch balls are well known in the art and are provided in various standard sizes (typically between 1⅞ inches to 2 5/16 inches in diameter) to which a ball-mount of a trailer or other apparatus to be towed is attached.

In accordance with the present invention, a shaft 16 extends vertically upwardly from the platform 12 in spaced relation to the hitch ball 14. The shaft 16 has a length sufficient to accommodate a drop height of the apparatus 10, as will be more fully described herein, as well as anticipated vertical travel of the hitch ball 14 as the towing vehicle and trailer encounter uneven ground surfaces. Such travel distance can be as little as several inches up to several feet. The shaft 16 is received within and is allowed to vertically slidably move within a sleeve 18. The sleeve 18 generally restricts the shaft movement, and thus platform 12 and ball 14, to vertical travel. As such, the interior configuration of the sleeve 18 generally matches the exterior configuration of the shaft 16, with the interior diameter of the sleeve 18 being slightly greater than the exterior diameter of the shaft 16.

The apparatus 10 also includes a hitch bar 20, which is typically generally L-shaped, as illustrated. A horizontal first arm 22 of the hitch bar 20 is configured to be removably attached to a receiver hitch of a towing vehicle. Such receiver-type hitches are well known and consist of a portion that mounts to the frame of the towing vehicle, and has a rearward-facing opening that accepts the horizontal arm 22 of the hitch bar 20. The horizontal arm 22 of the hitch bar 20 is removably attachable to the receiver hitch of the towing vehicle, such as by inserting a locking pin through aligned apertures of the receiver hitch and an aperture 24 of the horizontal arm 22.

The hitch bar 20 also includes a vertical second arm 26 which is operably connected to a coupling 28. This may be, for example, by means of a locking pin 30 insertable through an aperture 32 of the coupling 28 and an aperture 34 of the vertical arm 26. In a particularly preferred embodiment, the vertical arm 26 includes a plurality of spaced-apart apertures 34 which enable the vertical arm 26 to be adjustably connected to the coupling 28. This allows the apparatus 10 to accommodate varying rise or drop variations in the height of the towing vehicle as compared to the trailer to provide for level towing. It will be appreciated that the locking pin 30 may comprise other locking mechanisms, such as a nut and bolt arrangement, etc., which enables the coupling 28 to be securely and fixedly connected to the hitch bar 20 once the proper rise or drop has been determined.

The coupling 28 and sleeve 18 are connected to one another or integrally formed as a single piece. As illustrated in FIG. 1, a single piece slide cage 36 has adjacent tubes or passageways which define the coupling 28 and the sleeve 18. However, it will be appreciated that the sleeve 18 and the coupling 28 can be separate members which are interconnected to one another in order to accomplish the objectives of the invention.

With reference now to FIGS. 2A and 2B, the raising or the lowering of the hitch ball 14 in relation to the horizontal arm 22 of the hitch bar 20 is shown in order to raise or lower the hitch ball 14 so as to level the hitch ball 14 and trailer mount with respect to the horizontal arm 22 of the hitch bar 20, and thus the hitch receiver of the tow vehicle. What is also shown in FIGS. 2A and 2B is that the shaft 16 slides within sleeve 18, allowing the platform 12 and hitch ball 14 to move upwardly and downwardly. It will be understood by those skilled in the art that once the vertical arm 26 of the hitch bar 20 has been locked in place to the coupling 28, as illustrated in FIG. 1, the shaft 16 is still able to vertically move by sliding within sleeve 18 in order to accommodate the angle changes between the towing vehicle and trailer in real time during use, which can prevent impact of the platform 12 with the supporting ground surface, such as when encountering dips or bumps and the like in the road.

With reference again to FIG. 1, the vertical movement of the shaft 16 with respect to the sleeve 18 (and thus the coupling 28 and hitch bar 20) can be limited or controlled. For example, as illustrated in FIG. 1, a pin, bolt, or the like 38 can be inserted into an aperture 40 of the shaft 16 to limit downward movement of the shaft 16. The shaft 16 may have multiple apertures 40 for selectively adjusting the limited travel of the shaft 16.

Alternatively, or in addition to, one or more dampeners 42 may be coupled to the shaft 16 so as to control the vertical movement of the shaft 16 as the dampener 42 will dampen any sudden change in the travel of the shaft 16, and thus the platform 12 and tow hitch ball 14. The dampener 42 may be in the form of a spring or one or more shock absorbers, as illustrated. The shock absorber dampener 42 may have a first end 44 connected to the shaft 16 (or any portion fixed to the shaft 16), such as the platform 12, and a generally second end 46 attached to the sleeve 18, such as by means of the illustrated crossbar 48 which is attached to the sleeve 18 or exterior of the slide cage 36 and provides the attachment of two shock absorber dampeners 42. Thus, as the angle between the horizontal arm 22 and its connected hitch receiver of the tow vehicle and the tow hitch ball 14 and trailer change, such as encountering uneven ground surface, the shaft 16 (and platform 12 and hitch ball 14) will move either upwardly or downwardly in response to this angle change. Such changes can exert a significant amount of force upon the shaft 16, platform 12 and hitch ball 14, and the one or more dampeners 42 serve to dampen any sudden change in the travel of the platform 12, hitch ball 14 and shaft 16, and thus control the movement thereof.

With reference now to FIGS. 3A and 3B, it is contemplated by the present invention that the sleeve 18, or the slide cage 36 defining the sleeve 18, be reversible or invertible so as to provide a greater travel distance of the platform 12, ball 14, and shaft 16, as can be shown in the comparison of FIGS. 2A and 2B with FIGS. 3A and 3B. This enables either a greater rise or drop distance to be factored in when attaching the apparatus 10 to the towing vehicle and the trailer, and also provides a greater length of travel of the shaft 16, as well as the platform 12 and hitch ball 14 when the apparatus 10 is in use. It will be appreciated that the hitch ball 14, and thus the platform 12 and shaft 16, are allowed to move independent of the sleeve 18, coupling 28, and hitch bar 20 so as to allow the ball mount of the attached trailer to lower and rise in response to the change of angle between the tow vehicle and the trailer, such as when encountering uneven ground.

As shown in the various figures, a roller 50, such as a caster wheel or the like, may be operably connected to the platform 12 to prevent the apparatus 10 from being caught if impact with the ground occurs. The bracket 52 which interconnects the wheel or roller 50 with the platform 12 may be rotationally or pivotally attached to the platform 12 so as to allow the roller 50 to swivel. Thus, in cases of extreme angle variations between the towing truck and the trailer, such as when encountering a particularly large bump or depression in the ground surface, the roller 50 will engage the ground surface first and allow the apparatus 10 to roll along the uneven surface and reduce the likelihood of damage to the apparatus 10 and/or the towing vehicle or trailer.

Figure 4:
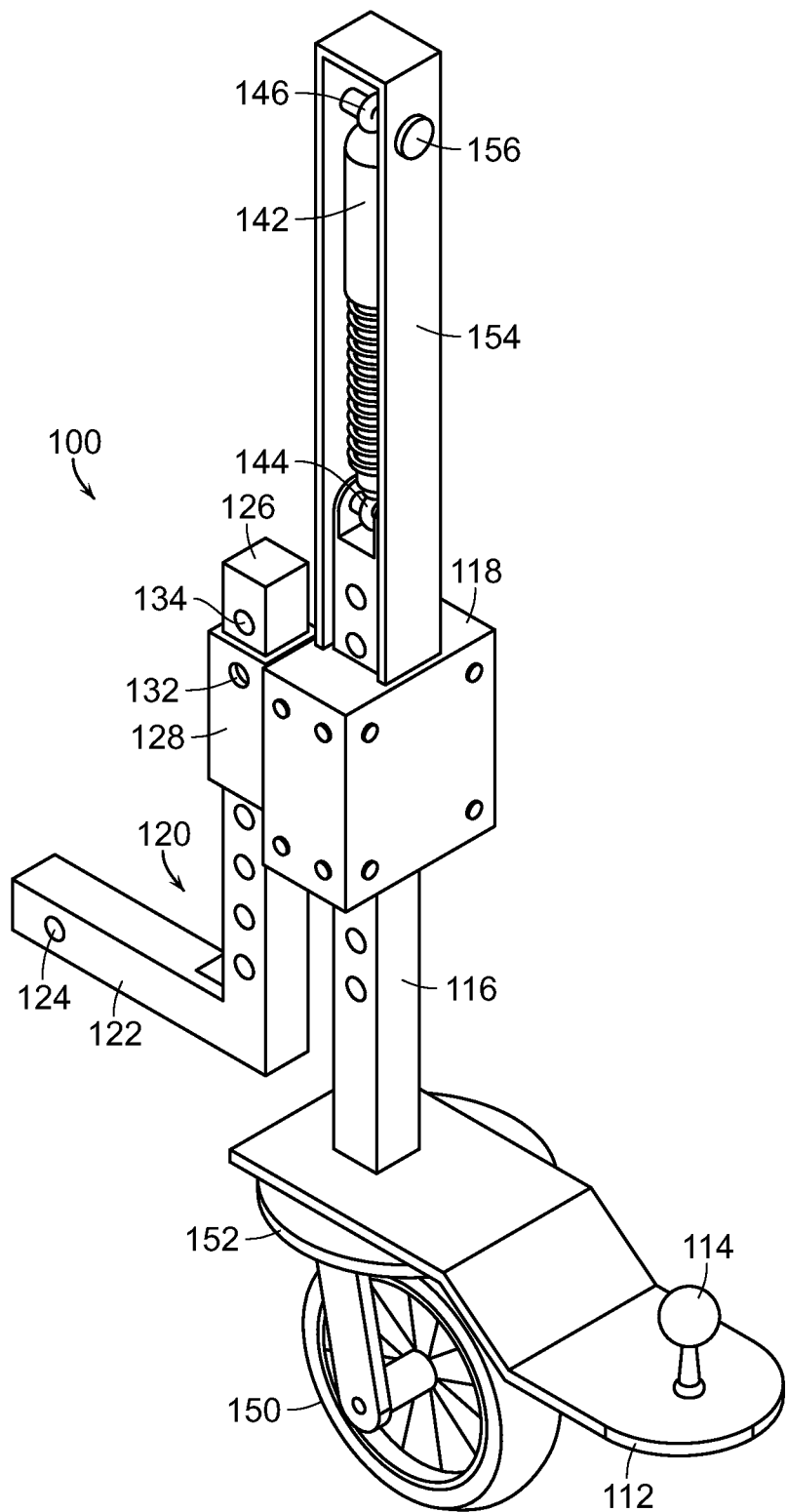
FIG. 4 is a side perspective view of another ball-mount hitch apparatus embodying the present invention.

With reference now to FIG. 4, another ball-mount hitch apparatus 100 embodying the present invention is shown. This apparatus 100 also includes a platform 112 supporting a hitch ball 114 and a shaft 116. Optionally, a roller or wheel 150 may be attached to a lower surface thereof, such as by means of bracket 152, which may or may not rotate and swivel. The shaft 116 is slidably received within a sleeve 118, which may or may not be formed integrally with, but is connected to, coupling 128 which receives the vertical arm 126 of the hitch bar 120, as described above. Alignable apertures 132 and 134 of the coupling 128 and the vertical arm 126 and a corresponding lock enable the hitch bar 120 to be adjustably connected to the coupling 128, to accommodate a necessary rise or drop in order to appropriately adjust the height between the towing vehicle and the trailer during initial coupling and installation. The horizontal arm 122 is received within a hitch receiver, and attached thereto, such as by inserting a pin through aperture 124.

The operation of the apparatus 100 illustrated in FIG. 4 is very similar to that illustrated above in FIGS. 1-3. However, in this case, the dampener 142 is connected at a first end 144 to the shaft 116, but the second end 146 thereof is connected to a strut 154 extending upwardly from the sleeve 118. This may be done, for example, by means of a locking pin 156 or the like inserted between the strut 154 and the opening of end 146. It will be seen that the shaft 116 (and thus the platform 112 and ball 114) are capable of vertical movement, but such vertical movement is limited or controlled by means of the dampener 142. Such dampeners 142 can be in the form of a spring, spring-based shock absorber, hydraulic shock absorber, or any other form of dampener which permits the shaft to move within the sleeve but dampen or control the movement thereof.

Figure 5:
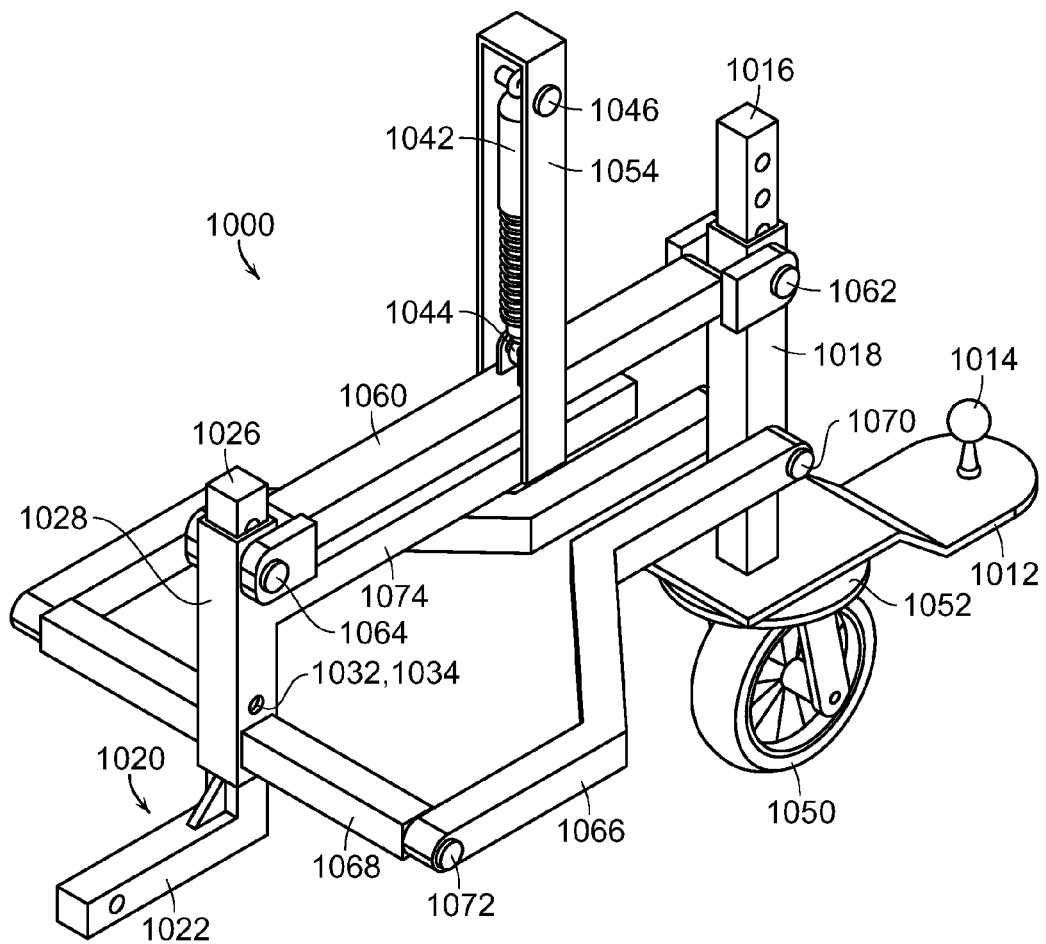
FIG. 5 is a perspective view of another ball-mount hitch apparatus embodying the present invention.

With reference now to FIG. 5, yet another apparatus 1000 embodying the present invention is shown. Once again, the ball-mount hitch apparatus 1000 includes a platform 1012 having a tow hitch ball 1014 extending therefrom and configured to mate with a corresponding member of a trailer hitch. A shaft 1016 extends upwardly from the platform 1012 and is slidably received within a sleeve 1018 so as to be moveable vertically along an axis thereof. Optionally, a roller or wheel 1050 may be attached to the platform 1012, such as by means of bracket 1052, which may be a swivel bracket 1052 in order to allow swiveling or rotation of the roller or wheel 1050.

At generally the opposite end of the apparatus 1000, is the hitch bar 1020, including a horizontal bar 1022 configured and adapted to be received and attached to a receiving hitch of a towing vehicle and a vertical arm 1026 adjustably coupled to a coupling 1028, such as by means of pin insertable and alignable apertures 1032 and 1034 of the coupling 1028 and vertical arm 1026.

It will be readily seen in FIG. 5, however, that the coupling 1028 and the sleeve 1018 are distant from one another. In this case, at least one extension 1060 interconnects the sleeve 1018 with the coupling 1028. Thus, the sleeve 1018 and the coupling 1028 are separate and distinct members, but are interconnected with one another by means of the extension 1060. The connecting point 1062 of the sleeve 1018 and the extension 1060 may be a pivotal connection. Alternatively, or in addition to, the connection of the generally opposite end of the extension 1060 to the coupling 1028 may be a pivotal connection 1064. This enables a degree of articulation and movement between the spaced apart coupling 1028 and sleeve 1018.

Additional extension bars 1066, 1068, etc. may interconnect the coupling 1028 and the sleeve 1018, as illustrated. The connecting points 1070 and 1072 of these extension bars 1066 and 1068 may comprise pivotal connections to allow for articulation.

Preferably, one or more dampeners are associated with the apparatus 1000 in order to dampen sudden movement of the platform 1012, ball 1014 and shaft 1016 in relation to the hitch bar 1020. Such a dampener could be attached and configured in a variety of manners, such as illustrated in FIGS. 1 and 4. However, FIG. 5 illustrates yet another arrangement wherein the dampener 1042 is connected to extension bar 1060 at a first end 1044 thereof, and to a vertical strut bracket 1054 at a generally second end 1046 thereof. It will be seen that the bracket strut 1054 connects to a member 1074 which is connected to or formed integrally with the coupling 1028. Thus, as the components of the apparatus 1000 which are movable towards the trailer end of the apparatus 1000, including the platform 1012, ball 1014 and shaft 1016 travel vertically, such movement is dampened and controlled by means of the dampener 1042, which dampens and limits the articulation of the front end, illustrated at the left of FIG. 5 and the rear end shown as the right side of the apparatus 1000 in FIG. 5. This dampens or limits the movement of the ball-mount portion of the apparatus 1000 in comparison to the receiver hitch portion of the apparatus 1000, while still allowing movement of the hitch ball 1014, and related components, with respect to the hitch bar 1020 to accommodate for changes in the angle between the tow hitch of the towing vehicle and the towed trailer.

Although several embodiments have been described in detail for purposes of illustration, various modifications may be made without departing from the scope and spirit of the invention. Accordingly, the invention is not to be limited, except as by the appended claims.

What is claimed is:

1. An automatically adjusting ball-mount hitch apparatus, comprising:
a platform;
a hitch ball extending from the platform for attachment to a trailer;
a shaft extending vertically from the platform and slidably disposed within a sleeve;
a hitch bar having a first generally horizontal arm adapted to be removably attached to a receiver hitch of a towing vehicle and a generally vertical arm attached to a coupling that is connected to or formed integrally with the sleeve;
wherein the shaft slidably moves within the sleeve in response to forces applied to the platform as the towing vehicle and trailer interconnected by the ball-mount hitch apparatus pass over uneven ground, permitting the platform and hitch ball to move, independent of the hitch bar, while the towing vehicle is towing the trailer.

2. The apparatus of claim 1, wherein the coupling and the sleeve define adjacent tubes of a slide cage.

3. The apparatus of claim 1, wherein the coupling defines a tube which receives the vertical arm of the hitch bar therein.

4. The apparatus of claim 1, wherein the vertical arm of the hitch bar is adjustably connected to the coupling along a length thereof.

5. The apparatus of claim 4, wherein the vertical arm of the hitch bar includes a series of spaced apart apertures alignable with an aperture of the coupling for insertion of a pin therethrough to lock the vertical arm of the hitch bar to the coupling.

6. The apparatus of claim 1, including a dampener for controlling movement of the shaft within the sleeve.

7. The apparatus of claim 6, wherein the dampener comprises a shock absorber operably connected to or associated with the shaft at one end thereof and to the sleeve at generally an opposite end thereof.

8. The apparatus of claim 1, including a roller extending downwardly from the platform.

9. The apparatus of claim 8, wherein the roller is connected to the platform so as to swivel with respect to the platform.

10. The apparatus of claim 1, including at least one extension extending between and connected to the coupling and sleeve.

11. The apparatus of claim 10, wherein the extension is pivotally connected to at least one of the coupling and sleeve.

12. The apparatus of claim 10, including a dampener associated with the extension for dampening the movement of the shaft within the sleeve.

13. An automatically adjusting ball-mount hitch apparatus, comprising:
   a platform;
   a hitch ball extending from the platform for attachment to a trailer;
   a shaft extending vertically from the platform;
   a slide cage having a coupling portion and a sleeve portion that slidably receives the shaft therein;
   a generally L-shaped hitch bar having a first generally horizontal arm adapted to be removably attached to a receiver hitch of a towing vehicle and a generally vertical arm received within and attached to the coupling portion of the slide cage;
   wherein the shaft slidably moves within the sleeve portion of the slide cage in response to forces applied to the platform as the towing vehicle and trailer interconnected by the ball-mount hitch apparatus pass over uneven ground, permitting the platform and hitch ball to move vertically, independent of the hitch bar, while the towing vehicle is towing the trailer.

14. The apparatus of claim 13, wherein the vertical arm of the hitch bar is adjustably connected to the coupling along a length thereof.

15. The apparatus of claim 13, including a dampener operably associated with the shaft for controlling vertical movement of the shaft.

16. The apparatus of claim 13, including a roller extending downwardly from the platform.

17. An automatically adjusting ball-mount hitch apparatus, comprising:
   a platform;
   a hitch ball extending from the platform for attachment to a trailer;
   a shaft extending vertically from the platform and slidably disposed within a sleeve;
   a generally L-shaped hitch bar having a first generally horizontal arm adapted to be removably attached to a receiver hitch of a towing vehicle and a generally vertical arm attached to a coupling;
   an extension extending between and connected to the sleeve and the coupling, wherein at least one of the connections to the extension is a pivotal connection;
   wherein the shaft is capable of vertical movement within the sleeve in response to vertical forces applied to the platform as the towing vehicle and trailer interconnected by the ball-mount hitch apparatus pass over uneven ground, permitting the platform and hitch ball to move vertically, independent of the hitch bar, while the towing vehicle is towing the trailer.

18. The apparatus of claim 17, wherein the vertical arm of the hitch bar is adjustably connected to the coupling along a length thereof.

19. The apparatus of claim 17, including a dampener for controlling vertical movement of the shaft.

20. The apparatus of claim 17, including a roller extending downwardly from the platform.

21. An automatically adjusting ball-mount hitch apparatus, comprising:
   a hitch bar adapted to be removably attached to a receiver hitch of a towing vehicle;
   a coupling attached to the hitch bar;
   a hitch ball operably connected to the coupling and removably attachable to a trailer; and
   a dampener for controlling vertical movement of the hitch ball;
   wherein the coupling is interconnected to an arm of the hitch bar and a shaft associated with the hitch ball;
   wherein the coupling comprises a slide cage having a tube lockingly connectable to the arm of the hitch bar along a length thereof and a sleeve which slidably receives the shaft therein, wherein the shaft moves vertically within the sleeve as the towing vehicle and trailer interconnected by the ball-mount hitch apparatus pass over uneven ground; and
   wherein the hitch ball independently moves generally vertically independent of the hitch bar in response to generally vertical forces applied to the hitch ball as the towing vehicle and trailer interconnected by the ball-mount hitch apparatus pass over uneven ground.

22. The apparatus of claim 21, wherein the dampener comprises a spring or shock absorber.

23. The apparatus of claim 21, wherein the dampener comprises a shock absorber operably connected to or associated with the shaft at one end thereof and to the sleeve at generally an opposite end thereof.

24. The apparatus of claim 21, including a platform from which the hitch ball and shaft extend.

25. The apparatus of claim 24, including a roller extending downwardly from the platform.

26. The apparatus of claim 21, including at least one extension pivotally connecting the hitch bar and the hitch ball.

* * * * *